P. L. MORGAN & W. M. BROCKENBROUGH.
MACHINE FOR SAWING CIRCLES.
APPLICATION FILED JAN. 21, 1910.

974,172.

Patented Nov. 1, 1910.
3 SHEETS—SHEET 1.

Inventors
Peyton L. Morgan and
William M. Brockenbrough
By C. A. Snow & Co.
Attorneys Witnesses P. L. MORGAN & W. M. BROCKENBROUGH.
MACHINE FOR SAWING CIRCLES.
APPLICATION FILED JAN. 21, 1910.

974,172.

Patented Nov. 1, 1910.
3 SHEETS—SHEET 2.

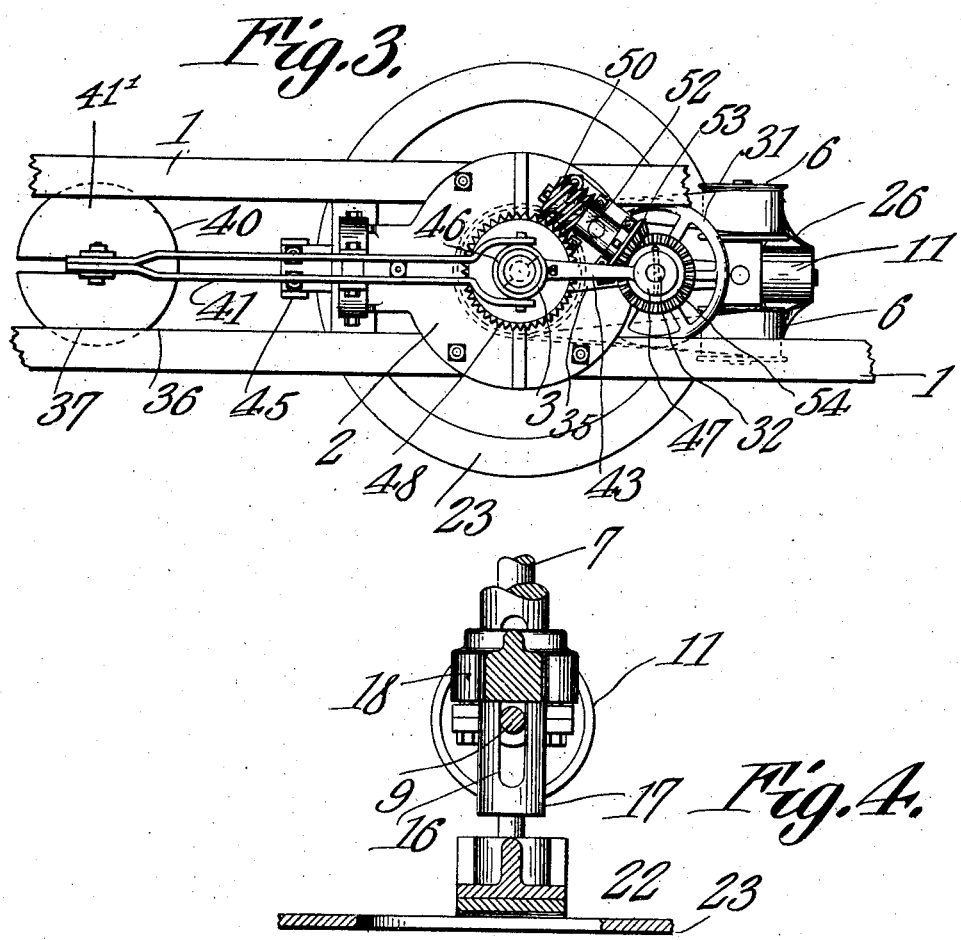

UNITED STATES PATENT OFFICE.

PEYTON L. MORGAN AND WILLIAM M. BROCKENBROUGH, OF LYNCHBURG, VIRGINIA.

MACHINE FOR SAWING CIRCLES.

974,172.  Specification of Letters Patent.  Patented Nov. 1, 1910.

Application filed January 21, 1910. Serial No. 539,215.

*To all whom it may concern:*

Be it known that we, PEYTON L. MORGAN and WILLIAM M. BROCKENBROUGH, citizens of the United States, residing at Lynchburg, in the county of Campbell and State of Virginia, have invented a new and useful Machine for Sawing Circles, of which the following is a specification.

Our invention relates to machines for sawing barrel heads and similar circular articles and it consists in certain novel features of the apparatus illustrated in the accompanying drawings, as will be hereinafter first fully described and then pointed out in the appended claims.

Figure 1:
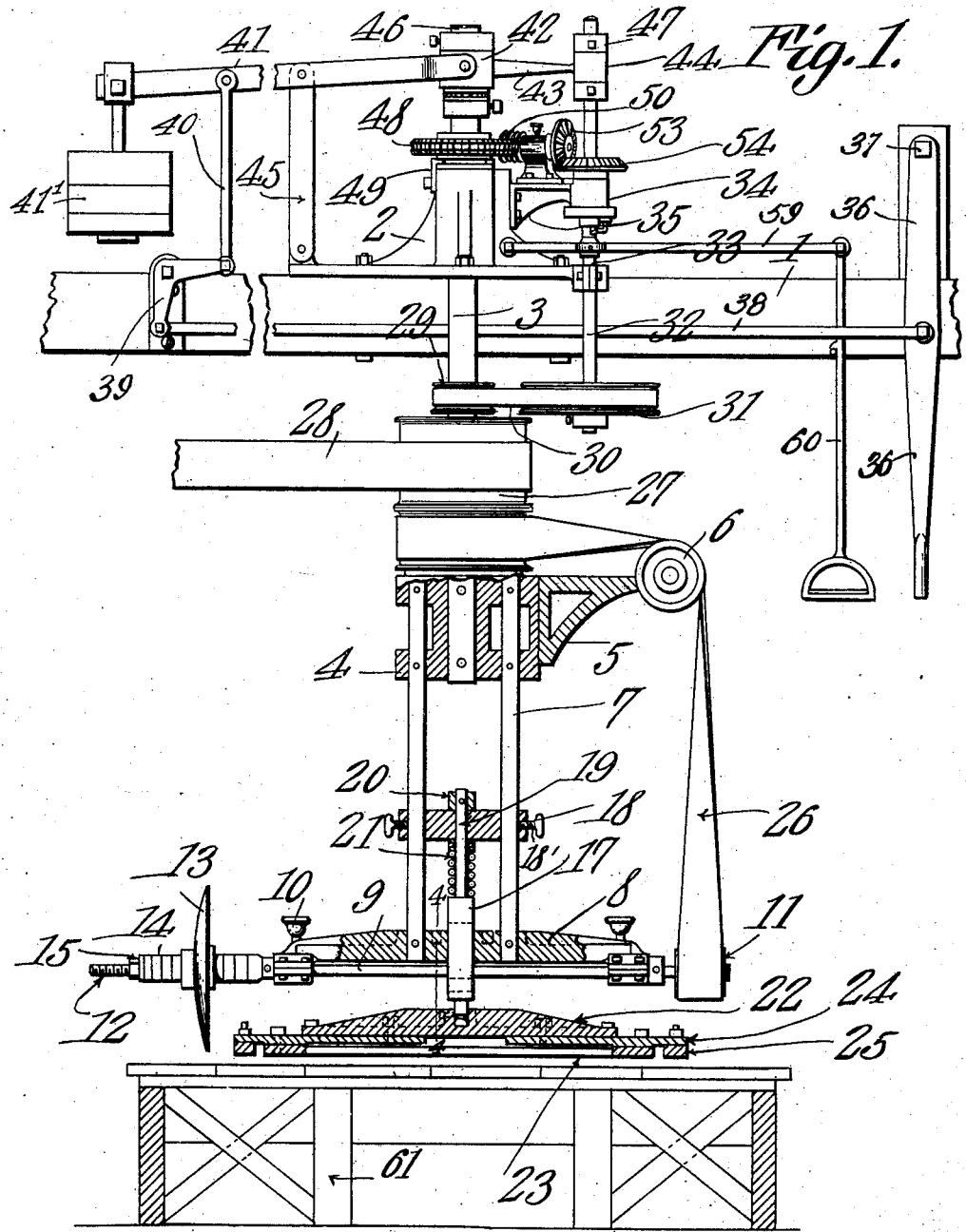
Figure 2:
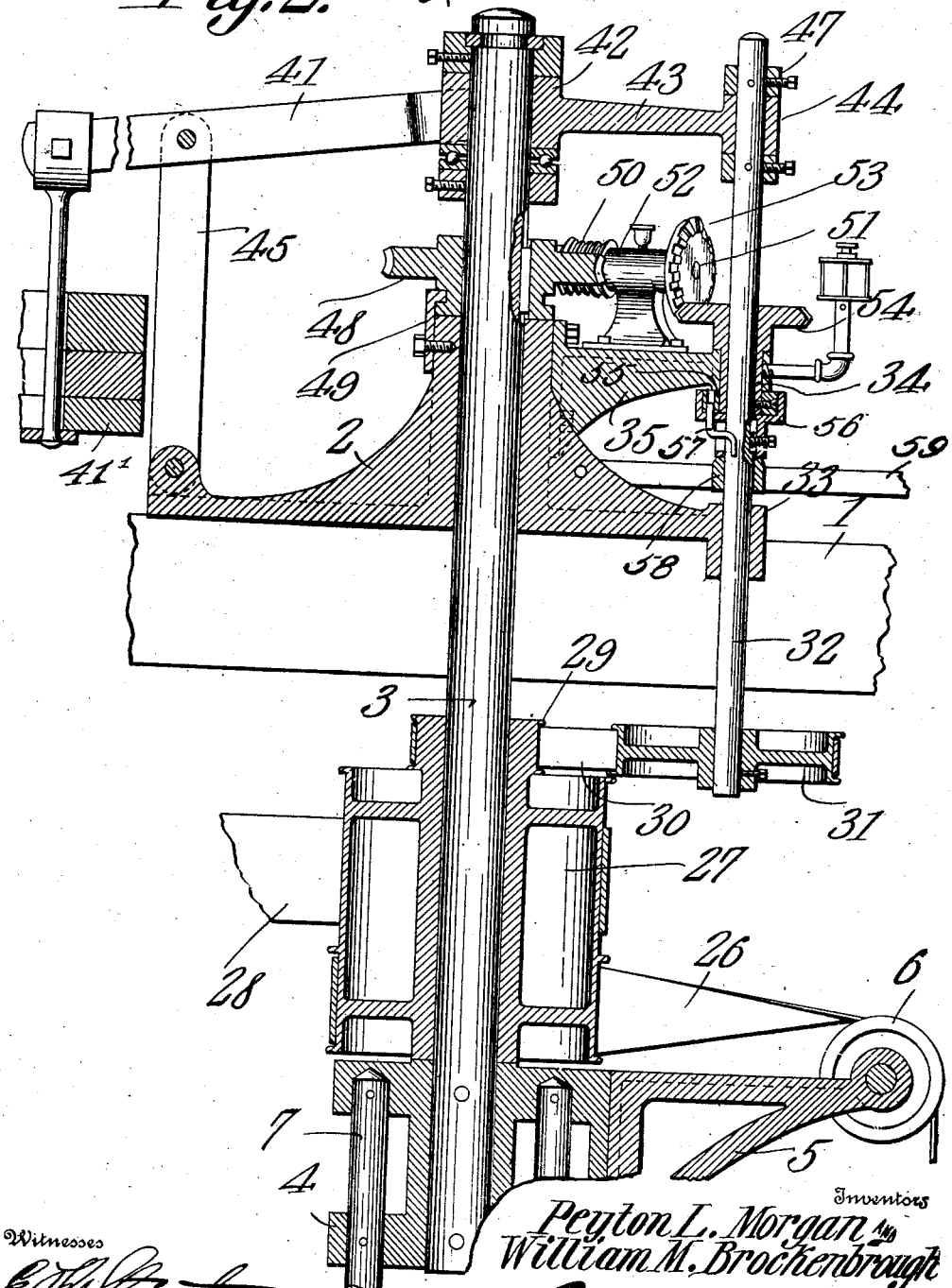

In the drawings,—Figure 1 is a side elevation of a machine embodying our present invention, the lower portion being shown in vertical section. Fig. 2 is an enlarged vertical sectional view of the upper portion of the apparatus. Fig. 3 is a plan view of the machine. Fig. 4 is a detail sectional view taken on the line 4—4 of Fig. 1, and Fig. 5 is a detail plan view of a portion of the work-holder.

In carrying out our invention, we secure rigidly to the rafters or beams 1 of the factory a casting or head 2 in which is slidingly mounted a vertical shaft 3 to the lower end of which is secured a frame 4 having a lateral arm or bracket 5 projecting from one side and on the outer end of the said bracket or arm 5 are mounted a pair of idler pulleys 6, as clearly shown. Secured rigidly in and depending from the head 4 are a pair of carrying rods 7 to the lower ends of which is rigidly secured a beam or carriage 8 in the ends of which the saw arbor 9 is journaled, suitable oil cups 10 being provided at the ends of the carriage to lubricate the bearings of the saw arbor, as will be readily understood. On one end of this saw arbor 9 is secured a pulley 11 while the other end of the arbor is provided with an extended threaded portion 12 on which a concave disk saw 13 is mounted.

The saw may be secured upon the arbor at any desired point so as to cut circles of different radii by shifting the washers 14 so that more or less of the washers may be at either side of the saw and then turning home the nut 15 on the threaded portion of the arbor so as to firmly clamp the saw between two adjacent washers, as will be readily understood. The saw arbor 9 passes through a central vertical slot 16 in a pin or rod 17 which has its upper end loosely mounted in a cross head 18 slidably fitted on the suspending rods 7. This pin 17 is provided with a reduced upper portion 19 which passes through the cross head 18 and has a collar 20 secured upon its upper extremity adapted to bear against the upper side of the cross head 18 and thereby support the pin 17, a spring 21 being coiled around the reduced portion of the pin below the cross head 18 so as to cushion the impact of the work-holder against the work. The cross head is held to the suspending rods by set screws 18' so that the cross head may be adjusted to and secured at such point of the suspending rods as will put the spring under the proper tension to hold the work.

The work-holder 22 is swiveled to the lower end of the pin 17, as clearly shown in Fig. 1, and the said pin thereby serves as a pivot around which the sawing mechanism may rotate in the operation of the apparatus. The work-holder comprises a diametrical beam swiveled to the lower end of the pin 17 and a circular band or ring 23 removably secured to the ends of the said beam by means of connecting plates 24, as will be readily understood. A plurality of the bands 23 will be provided, of various diameters, so that they may interchangeably secured to the diametrical beam of the work-holder and the holder thereby adapted to work of different sizes. In order to provide a firm grip on the side boards of the barrel head, a presser block 25 is provided at the ends of each connecting plate 24 which will bear upon the work close to the extreme edge of the same so that it will not split off as the saw cuts through the same.

Motion is imparted to the saw arbor by means of a belt 26 passing around the pulley 11 and over the idler pulleys 6 and thence around the lower portion of a driving band pulley 27 which is mounted loosely on the vertical shaft 3 above the head or bracket 4, as shown. The driving belt 28 passes around the upper portion of the pulley 27 and imparts motion to the said pulley from any convenient form of prime motor such as a steam engine or electric motor.

Formed integral with or secured rigidly to the upper end of the pulley 27 is a smaller pulley 29 around which a belt 30 passes to transmit the motion thereof to a pulley 31 secured to the lower end of a vertical counter shaft 32 which is journaled in a bearing 33 at the base of the head or casting 2 and in a similar bearing 34 at the outer end of an arm 35 secured to and projecting laterally from the said head. The shaft 32 is movable vertically in its bearings so as to move with the main shaft 3 and thereby maintain the proper operative relation of the pulleys 29 and 31 and the belt 30 passing around the same, and in order to effect a simultaneous vertical movement of the two shafts, we employ a lever 36 which is pivoted, as at 37, to the frame of the building and is pivotally attached at an intermediate point of its length to a connecting rod 38 extending to an angle lever 39 mounted in a suitable bearing on the frame of the building. This angle lever is connected by a link 40 with a lever 41 having one end pivoted to a collar or ring 42 encircling the upper end of the main shaft 3 and provided with a lateral arm 43 extending to and merging into a ring or collar 44 which encircles the upper end of the counter shaft 32. The lever 41 is supported upon a fulcrum link 45, the upper end of which is pivoted to the lever between the ends thereof, and the lower end of which is pivotally attached to the head or casting 2, as clearly shown, and on the free end of the lever is suspended a counterbalance 41' to balance the weight of the machine. It will be readily understood that upon vibrating the lever 36 the connecting rod 38, and angle lever 39 will be actuated and their motion transmitted through the link 40. The lever 41 will, consequently, be vibrated so that the rings or collars 42 and 44 will be simultaneously moved vertically.

In order to cause the shafts 3 and 32 to follow the movements of the collars 42 and 44, rings or collars 46 and 47 are secured to the said shafts above and below the collars, as will be readily understood. A worm wheel 48 is keyed to the main shaft 3 and rests upon and is held to the head 2 by clips or brackets 49 secured to the said head and engaging an annular groove in the hub of the worm wheel, as clearly shown, and as will be readily understood. This worm wheel 48 is engaged by a worm 50 on the inner end of a shaft 51 which is mounted in a tubular bearing 52 on the upper side of the bracket 35 and has a beveled gear 53 secured to its outer end. This beveled gear 53 meshes with a similar gear 54 which is fitted loosely around the shaft 32 and rests upon the outer extremity of the bracket 35. It will thus be seen that we provide for turning the shaft 3 and consequently cause the saw arbor to describe a horizontal circle in the operation of the machine so that the saw will be carried around the work and cut a circle of the desired diameter. The motion of the driving pulley 27 will be transmitted directly to the pulley 29 and from the same to the pulley 31 through the belt 30 so that the shaft 32 will be rotated and the movement of this shaft will be transmitted to the pinion 54 so as to actuate the pinion 53 and the shaft 51 upon which it is secured. The worm 50 will consequently be rotated so as to actuate the worm wheel 48 and consequently the shaft 3 the head 4, the suspending rods 7 depending from the same, and the carriage 8 will turn about the pin 17 as a center.

The hub of the pinion 54 depends through the bracket 35 and is provided on its lower end with a notched flange 55 forming a clutch member. Secured to the shaft below the said flange is a sleeve 56 carrying a slidable pin 57 adapted to engage the notches in the flange and thereby lock the pinion to the shaft so that rotation of the shaft will be imparted to the pinion and thence through the shaft 51 and the described gearing to the shaft 3. The lower end of the slidable pin rests upon a ring 58 fitted on the shaft 32 and carried by a lever 59 fulcrumed upon the head 2 and having an operating rod 60 depending from its free end.

It is thought the operation and advantages of our sawing machine will be readily appreciated from the foregoing description, taken in connection with the accompanying drawings. The boards which are to form the head of a barrel or cask are placed upon a work-table 61 and the lever 36 is manipulated so as to vibrate the lever 41 and thereby permit the shafts 3 and 32 to descend, consequently carrying the work-holder 22 against the boards so that they will be firmly clamped to the work-table or bench, as will be readily understood. The saw having been brought to the desired point the motor is started and consequently motion will be imparted to the driving pulley and from the same to the several parts of the described gearing and the saw being caused to cut through the boards. After the saw has cut through the boards, the rod 60 is pushed upward so as to vibrate the lever 59 and lock the pinion 54 to the shaft 32 whereupon the shaft 3 will be rotated so as to swing the saw arbor in a horizontal plane and thereby feed the saw to its work and cause the same to cut a circle. After a circle has been completed, the apparatus may be raised to permit the removal of the work without stopping the rotation of the saw and consequently avoid the loss of time while the saw is acquiring the speed necessary for successful and easy operation.

Our device is extremely simple in its construction and compact in its arrangement and will be found very efficient for the purposes stated.

While we have shown and described belts and pulleys for transmitting motion from the driving pulleys such showing is typical only and any form of gearing may be employed.

Having thus described our invention, what we claim is:

1. In a sawing machine, the combination with an upright main shaft journaled for rotation and vertical movement in a fixed support, a saw carriage connected with and carrying a saw arbor at right angles to said shaft, a saw on the arbor, and means for rotating it; of a countershaft geared to said main shaft, means for rotating the countershaft to turn the main shaft and carriage, and means for raising said shafts simultaneously.

2. In a sawing machine, the combination with an upright main shaft journaled for rotation and vertical movement in a fixed support, a saw carriage connected with and carrying a saw arbor at right angles to said shaft, and a saw on the arbor, of a power pulley mounted loosely on said shaft, connections between it and said arbor, a countershaft geared to the main shaft for turning the latter, connections between the countershaft and said pulley, and means for raising the shafts simultaneously.

3. In a sawing machine, the combination with an upright main shaft, a saw carriage connected therewith, and a saw arbor journaled in the carriage transversely to the main shaft and carrying a circular saw; of pulleys loosely mounted on the shaft and connected with each other, means for imparting rotary motion to one of them, means connecting the second pulley with said saw arbor for rotating the latter, a countershaft geared to the main shaft for turning the latter, and a belt leading from the third of said pulleys to the countershaft.

4. In a sawing machine for cutting barrel heads and the like, the combination with an upright main shaft, a saw carriage connected therewith and standing at right angles thereto, and a saw arbor journaled in the carriage and carrying a circular saw near one extremity; of pulleys loosely mounted on the shaft and connected with each other, means for imparting rotary motion to one of them, a belt leading from a second pulley to a pulley on the opposite end of said saw arbor, a countershaft geared to the main shaft for turning the latter, and a belt leading from the third of said pulleys to the countershaft.

5. In a sawing machine, the combination of a rigid support, a vertical shaft slidably mounted therein, a saw carriage connected at right angles to the lower end of the said shaft, a saw in the carriage means for raising and lowering the said shaft, means for turning the said shaft, and means for rotating the saw.

6. In a sawing machine, the combination of a fixed support, a shaft mounted therein, a saw carriage supported by the lower end of the said shaft, a driving pulley loosely mounted on the said shaft, gearing between the said driving pulley and the said shaft to turn the same, a saw supported by the saw carriage, and gearing between the driving pulley and the saw to rotate the same.

7. In a sawing machine, the combination of a fixed support, a shaft slidably mounted therein, a head secured to the lower end of the said shaft, suspending rods secured in and depending from said head, a saw carriage secured to the lower ends of said suspending rods, a saw supported by said carriage, means for rotating the saw, and means for turning the slidable shaft.

8. The combination of a fixed support, a main shaft slidably mounted therein, a saw carriage connected at right angles to said shaft, a saw in the carriage a countershaft slidably mounted in the fixed support, a driving pulley loosely mounted on the main shaft, gearing between said driving pulley and the countershaft, gearing between the countershaft and the main shaft, and means for simultaneously raising and lowering the main shaft and the countershaft.

In testimony that we claim the foregoing as our own, we have hereto affixed our signatures in the presence of two witnesses.

PEYTON L. MORGAN.
WM. M. BROCKENBROUGH.

Witnesses:
J. L. NICHOLAS,
W. O. BELL.